(12) United States Patent
Prosyk

(10) Patent No.: US 6,717,708 B2
(45) Date of Patent: Apr. 6, 2004

(54) RE-CIRCULATING OPTICAL PULSE GENERATOR

(75) Inventor: Kelvin Prosyk, Ottawa (CA)

(73) Assignee: Bookham Technology, plc, Abingdon (GB)

( * ) Notice: Subject to any disclaimer, the term of this patent is extended or adjusted under 35 U.S.C. 154(b) by 155 days.

(21) Appl. No.: 10/116,168

(22) Filed: Apr. 5, 2002

(65) Prior Publication Data

US 2003/0189744 A1 Oct. 9, 2003

(51) Int. Cl.[7] .............................. G02F 1/00; G02F 1/01; H04B 10/12
(52) U.S. Cl. ...................... 359/239; 359/276; 398/201
(58) Field of Search ................... 359/239, 276, 359/279; 398/183, 186, 195, 198, 201

(56) References Cited

U.S. PATENT DOCUMENTS

2003/0189744   * 10/2003   Prosyk ..................... 359/237

* cited by examiner

Primary Examiner—David N. Spector
(74) Attorney, Agent, or Firm—Lahive & Cockfield, LLP; Anthony A. Laurentano

(57) ABSTRACT

A Mach-Zehnder Modulator (MZM) pulse generator is provided having an increased power output. Power carved from the output signal in creating the pulses is recycled back to the input of the pulse generator via a feedback arm. Careful design of the length of the feedback arm such that a feedback signal has a propagation time of $(2n+1)T/2$ to complete one loop (n being a non-negative integer and T being the pulse period) allows a 50% duty cycle to be obtained using a driving frequency of only one half of the pulse frequency.

20 Claims, 1 Drawing Sheet

RE-CIRCULATING OPTICAL PULSE GENERATOR

FIELD OF THE INVENTION

This invention relates to optical communication components, and more particularly to Mach-Zehnder Modulator pulse generators.

BACKGROUND OF THE INVENTION

A recent trend in optical communications is to use a Mach-Zehnder Modulator (MZM) as a pulse generator for generating optical pulses. A continuous wave optical signal is inserted into one of two input arms of the MZM. A first coupler splits the continuous wave optical signal into two branch signals, each of which passes along a different branch of the MZM. Driving electrodes operating at a driving frequency alter the phase of each branch signal so that the phase difference between the two branch signals varies. The two branch signals pass through a second coupler, where they are combined to produce an output signal. Because the phases of the branch signals are varied by the drivers, the branch signals will have a variable phase difference upon entering the coupler, and will interfere to a degree that depends on their phase difference.

In this way, pulses are carved from the continuous wave and sent along an output arm as an output signal. The power carved out of the continuous wave is either dissipated, or sent along a second output arm where it is discarded or simply used for monitoring purposes. This is wasted output power which could otherwise be used for improving the power of the output signal.

One characteristic of the pulses is a duty cycle, which is defined as the ratio of the full-width half maximum of a pulse to the period of the pulse. An MZM pulse generator normally operates in one of three states: "normally on", "normally off", and "quadrature". In a typical MZM pulse generator, when operating in a "normally on" state the pulses transmitted as the output signal have a duty cycle of 33% when the driving electrodes apply sinusoidal driving signals. When operating in a "normally off" state, the pulses transmitted as the output signal have a duty cycle of 66%. When operating in a "quadrature" state, the pulses transmitted as the output signal have a duty cycle of 50%.

There is a growing interest in obtaining a 50% duty cycle, especially for long haul 40 Gb/s transmissions. However, operation of an MZM pulse generator in a quadrature state requires either that the driving frequency of the driving electrodes be the same as the pulse frequency, or that the driving electrodes operate at twice the swing voltage required for a "normally on" state. Both of these solutions require more expensive components and additional power consumption. A 50% duty cycle may also be obtained by altering the split ratios of the couplers or by using non-symmetric electrode lengths in the driving electrodes. However, these methods can introduce chirp to the output signals, to which 40 Gb/s systems are highly sensitive. A 50% duty cycle may also be obtained by using cascaded modulators. However, this requires the introduction of a second active device, increasing the cost and complexity of the pulse generator.

SUMMARY OF THE INVENTION

The present invention provides an optical pulse generator which recycles unused power back to the input of the pulse generator. The optical pulse generator receives a continuous wave optical signal and produces a series of pulses. The optical pulse generator includes a Mach-Zehnder Modulator (MZM) having two input arms and two output arms, the first input arm for receiving the continuous wave optical signal and the first output arm for producing the series of pulses. The MZM is configured such that substantially none of a continuous wave optical signal enters the second output arm when the MZM is not being driven by a variable voltage. The optical pulse generator also includes a feedback arm which couples the second output arm to the second input arm. The feedback arm has a length such that a signal travelling in a loop around the MZM and the feedback arm has a propagation time τ given by $$\tau = (2n+1)\frac{T}{2}$$

where n is a non-negative integer and T is a pulse period of the pulses. The feedback arm includes a Direct Current phase adjuster.

In one embodiment, the MZM includes a first phase modulation section in a first branch arm, driven by a sinusoidal voltage at a driving frequency equal to half the pulse frequency of the series of pulses. The MZM also includes a second phase modulation section in a second branch arm, driven by a sinusoidal voltage at the driving frequency and 180° out of phase with the sinusoidal voltage driving the first phase modulation section.

In another embodiment, the MZM includes two 2×2 couplers, each having a 50—50 splitting ratio and introducing a 0° and a 90° phase shift, and a phase delay of π radians in the first branch arm. The couplers may be Multi-Mode Interference couplers.

The feedback arm may include a splitter leading to a signal monitoring system.

The invention also provides an optical pulse generator which recycles unused power back to the input of the pulse generator. The optical pulse generator receives a continuous wave optical signal and produces a series of pulses. The optical pulse generator includes a Mach-Zehnder Modulator (MZM) having two input arms and two output arms, the first input arm for receiving the continuous wave optical signal and the first output arm for producing the series of pulses. The MZM is configured such that substantially none of a continuous wave optical signal enters the second output arm when the MZM is not being driven by a variable voltage. The optical pulse generator also includes a feedback arm which couples the second output arm to the second input arm. The feedback arm has a length such that a signal travelling in a loop around the MZM and the feedback arm has a propagation time τ given by $$\tau = (2n+1)\frac{T}{2}$$

where n is a non-negative integer and T is a pulse period of the pulses. The length of the feedback arm is also such that there is substantially no phase difference between a feedback signal propagating along the feedback arm and the continuous wave optical signal upon entering the MZM In one embodiment, the MZM includes a first phase modulation section in a first branch arm, driven by a sinusoidal voltage at a driving frequency equal to half the pulse frequency of the series of pulses. The MZM also includes a second phase modulation section in a second branch arm, driven by a sinusoidal voltage at the driving frequency and 180° out of phase with the sinusoidal voltage driving the first phase modulation section, In another embodiment, the MZM includes two 2×2 couplers, each having a 50—50 splitting ratio and introducing a 0° and a 90° phase shift, and a phase delay of π radians in the first branch arm. The couplers may be Multi-Mode Interference couplers.

The feedback arm may include a splitter leading to a signal monitoring system.

The optical pulse generator of the invention allows improved output power of a pulse generator by recycling otherwise discarded power back to the input of the MZM. In addition, a 50% duty cycle can be achieved with the driving frequency of the drivers at only half of the pulse frequency, thereby reducing the cost and power consumption of the pulse generator for a given pulse frequency. If the optical pulse generator is an optical integrated circuit, minimal additional manufacturing steps are required over manufacture of the MZM alone, since the feedback arm is created during the same step as the creation of the waveguides (i.e. the input arms, branch arms, MMIs, and output arms) of the MZM. The optical pulse generator can also be designed to a length comparable to the MZM alone.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
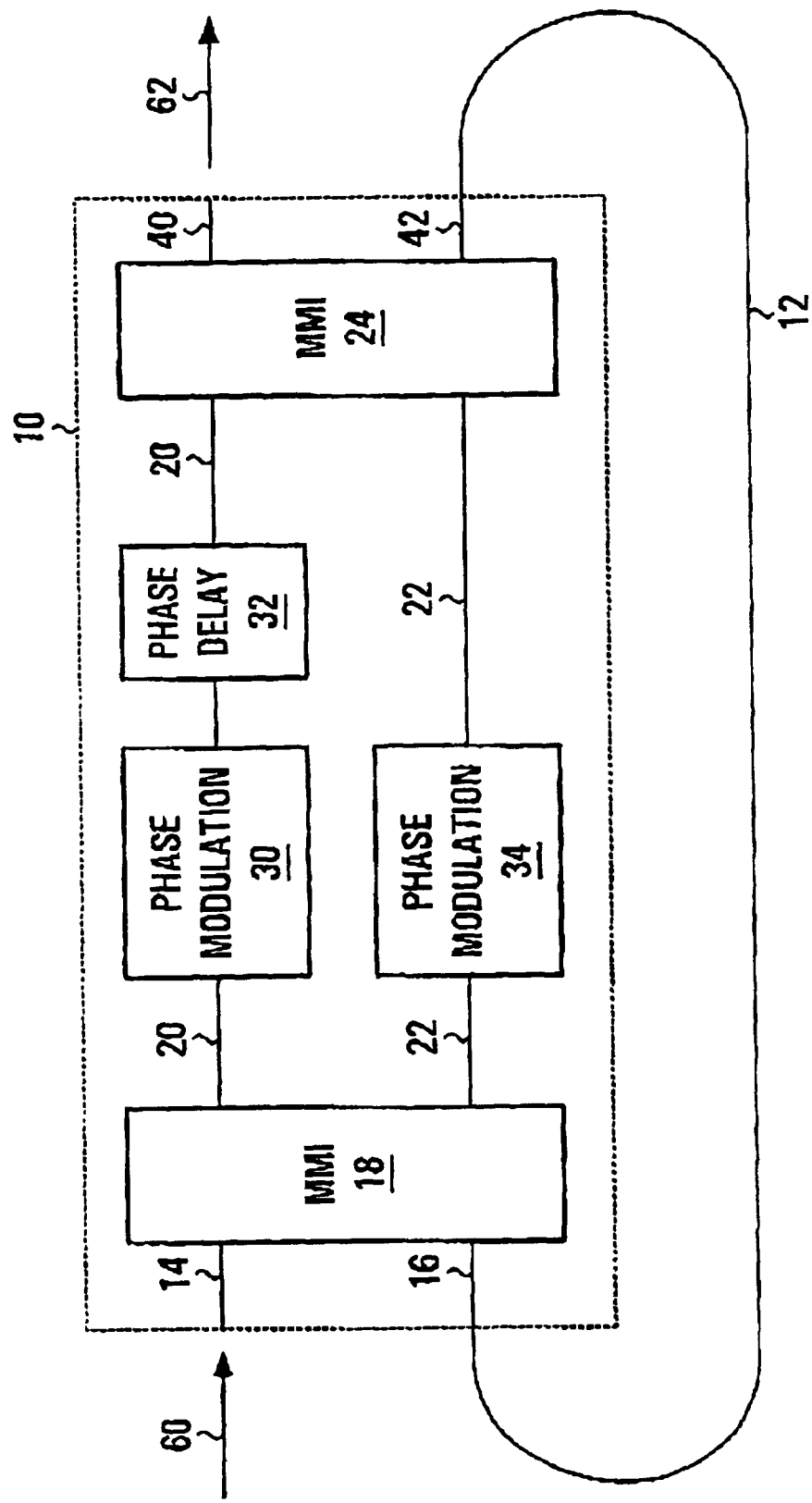
FIG. 1 is a block diagram of an optical pulse generator according to one embodiment of the invention.

Referring to FIG. 1, a block diagram of an optical pulse generator according to one embodiment of the invention is shown. At a high level, the optical pulse generator comprises a Mach-Zehnder Modulator (MZM) 10 and a feedback arm 12, the feedback arm 12 coupling one output of the MZM 10 with one input of the MZM 10.

The MZM 10 includes a first input arm 14 and a second input arm 16 which enter a first Multi-Mode Interference (MMI) coupler 18. The first MMI coupler 18 is a 2×2 coupler, has a splitting ratio of 50—50, and introduces phase shifts of 0° and 90°. A first branch arm 20 and a second branch arm 22 leave the first MMI coupler 18 and enter a second MMI coupler 24. Like the first MMI coupler 18, the second MMI coupler 24 is a 2×2 coupler, has a splitting ratio of 50—50, and introduces phase shifts of 0° and 90°. The first branch arm 20 includes a first phase modulation section 30 and a phase delayer 32. The phase delayer 32 may be intrinsic or extrinsic. An intrinsic phase delayer is an effect of the first branch arm 20 itself, such as altering the length of the waveguide to effect the phase shift. An extrinsic phase delayer is a component, such as a direct current tuning section within the first branch arm 20. The second branch arm 22 includes a second phase modulation section 34. Each phase modulation section 30 and 34 includes electrodes to which a sinusoidal voltage is applied by a respective driver (not shown). The sinusoidal voltages are applied at an identical driving frequency, but 180° out of phase with each other. A first output arm 40 and a second output arm 42 exit the second MMI coupler 24.

The second output arm 42 leads to the feedback arm 12, which leads to the second input arm 16. It should be noted that there is no break or junction between the second output arm 42 and the feedback arm 12, or between the feedback arm 12 and the second input arm 16. For this reason, the feedback arm 12 will hereinafter be deemed to include the second output arm 42 and the second input arm 16.

The optical pulse generator is preferably formed as an optical integrated circuit using standard manufacturing techniques. For example, the feedback arm 12 may be a waveguide of GaAs, InP, or diffused LiNbO$_3$. Alternatively, the optical pulse generator may comprise discrete components and fiber optic connections. Generally, the feedback arm 12 may take the form of any optical path satisfying a length requirement described below, including a fiber optic connection, and may include regions of free space.

In operation, a continuous wave (CW) signal 60 enters the first input arm 14. The first MMI coupler 18 combines the CW signal 60 with any signal entering from the second input arm 16 to form a first combined signal. The MMI coupler 18 splits the first combined signal at the 50—50 splitting ratio into a first branch signal sent along the first branch arm 20 and a second branch signal sent along the second branch arm 22. The first branch signal passes through the first phase modulation section 30. The sinusoidal voltage applied to the first phase modulation section 30 alters the phase of the first branch signal. Similarly, the phase of the second branch signal is varied by the sinusoidal voltage applied to the second phase modulation section 34.

The first branch signal also passes through the phase delayer 32 where it experiences a constant phase delay. The constant phase delay is π radians so that, in conjunction with the 0° and 90° phase shifts introduced by the MMI couplers 18 and 24, no light enters the second output arm 42 when the sinusoidal voltages are at the mid-point of their voltage swings, or when the phase modulation sections 30 and 34 are not being driven. As a result of the 180° phase difference between the sinusoidal voltage applied to the first phase modulation section 30 and the sinusoidal voltage applied to the second phase modulation section 34, the first branch signal and the second branch signal will have a variable phase difference upon entering the second MMI coupler 24. The second MMI coupler 24 combines the first branch signal and the second branch signal to produce a second combined signal. The second MMI coupler 24 splits the second combined signal at a 50—50 splitting ratio into an output signal 62 sent along the first output arm 40 and a feedback signal sent along the feedback arm 12. The output signal 62 comprises a series of pulses, and has an output power, a pulse frequency, a pulse period, and a duty cycle.

Rather than discard energy from the second output arm 42, the energy is recycled back to the MZM 10 via the feedback arm 12. The feedback signal enters the first MMI coupler 18 via the first input arm 16. This increases the output power of the output signal 62. With losses typical of GaAs and InP and for typical device lengths, the increase in output power may be as high as 2.3 dB.

In order that this recycling of energy result in a useful output signal, the feedback arm 12 should have a length such that the optical pulse generator behaves as a resonator ring, with the pulse frequency being twice the driving frequency. This condition will be met if a signal completing one loop from the second MMI coupler 24, along the feedback arm 12, through the first MMI coupler 18, along the branch arms 20 and 22, and back to and through the second MMI coupler 24, has a propagation time given by $$\tau = (2n+1)\frac{T}{2},$$

where n is a non-negative integer and T is the pulse period of the output signal. This propagation time requires an accuracy in the length of the feedback arm 12 on the order of one millimeter, which can be easily obtained during manufacturing. The feedback arm 12 is shown as a waveguide which is curved at either end of a straight portion exactly parallel to the arms 20 and 22, but it may have any shape or size, as long as this propagation time is satisfied. Of course, the shape and size of the feedback arm may be limited by other constraints considered in the design of any optical device, such as optical losses.

Another condition for obtaining a useful output signal is that the feedback signal should be in phase with the CW signal 60 upon entering the first MMI coupler 18. In one embodiment, the feedback arm 12 includes a DC phase adjuster. The DC phase adjuster allows the phase of the feedback signal to be fine-tuned after manufacturing in order to minimize the phase difference between the feedback signal and the CW signal 60 upon entering the first MMI coupler 18. In another embodiment the feedback arm 12 does not include the DC phase adjuster, but is manufactured so as to have a length such that there is substantially no phase difference between the feedback signal and the CW signal 60 upon entering the first MMI coupler 18. However, this embodiment is less preferred than the embodiment with the DC phase adjuster, as an accuracy in the length of the feedback arm 12 on the order of much less than one micron is required.

With such a length of the feedback arm 12, the output signal has a 50% duty cycle with the driving frequency at only half the pulse frequency. This reduces the cost and power consumption of the pulse generator for a given pulse frequency, since a 50% duty cycle can be achieved with only half the driving frequency normally required.

Other phase delays may be introduced by the phase delayer 32 if the MMI couplers 18 and 24 introduce phase shifts other than 0° and 90°, or if the first and second branch arms 20 and 22 have differences in length which introduce a phase difference between the first and second branch signal. Generally, the MZM 10 should be configured such that no light enters the second output arm 42 when the phase modulation sections 30 and 34 are not driven by a variable voltage, or when the sinusoidal voltages are at the mid-point of their voltage swings. The MZM 10 can be so configured by design of all components which introduce a constant phase difference between the first and second branch signals (such as the MMI couplers 18 and 24, the phase delayer 32, and the lengths of the first and second branch arms 20 and 22) as is well known to those skilled in the art.

Rather than using MMI couplers as the couplers 18 and 24, other couplers which combine and split signals may be used. However, any such coupler must have at least two inputs and at least two outputs, and should preferably have a splitting ratio of 50—50 and introduce phase shifts of 0° and 90°. For example, evanescent coupling could be used. Other phase shifts can be used, but the phase shift introduced by the phase delayer 32 must then be changed in order that no light enters the second output arm 42 when the phase modulation sections 30 and 34 are not driven by a variable voltage, or when the sinusoidal voltages are at the mid-point of their voltage swings.

A splitter may be added to the feedback arm 12 to separate a small portion of the feedback signal for monitoring purposes, the splitter leading to a signal monitoring system. This has the drawback of introducing a loss to the feedback arm, but this is a minor effect and does not affect the improvement in output power significantly.

What has been described is merely illustrative of the application of the principles of the invention. Other arrangements and methods can be implemented by those skilled in the art without departing from the spirit and scope of the present invention.

What is claimed is:

1. An optical pulse generator for receiving a continuous wave optical signal and producing a series of pulses, the optical pulse generator comprising:

a Mach-Zehnder Modulator (MZM) having a first input arm for receiving the continuous wave optical signal, a second input arm, a first output arm for producing the series of pulses, and a second output arm, and configured to operate such that substantially none of a continuous wave optical signal enters the second output arm when the MZM is not being driven by a variable voltage;

a feedback arm coupling the second output arm to the second input arm, and having a length such that a signal travelling in a loop around the MZM and the feedback arm has a propagation time given by $$\tau = (2n+1)\frac{T}{2}$$

where n is a non-negative integer and T is a pulse period of the pulses; and a Direct Current phase adjuster in the feedback arm.

2. The optical pulse generator of claim 1 wherein the MZM comprises:

a first phase modulation section in a first branch arm, driven by a sinusoidal voltage at a driving frequency equal to half a pulse frequency of the series of pulses; and a second phase modulation section in a second branch arm, driven by a sinusoidal voltage at the driving frequency and 180° out of phase with the sinusoidal voltage driving the first phase modulation section.

3. The optical pulse generator of claim 1 wherein the MZM comprises:

a first 2×2 coupler having a 50—50 splitting ratio and introducing a 0° and a 90° phase shift;

a second 2×2 coupler having a 50—50 splitting ratio and introducing a 0° and a 90° phase shift; and a phase delay of π radians in the first branch arm.

4. The optical pulse generator of claim 3 wherein each coupler is a Multi-Mode Interference coupler.

5. The optical pulse generator of claim 2 wherein the MZM comprises:

a first 2×2 coupler having a 50—50 splitting ratio and introducing a 0° and a 90° phase shift;

a second 2×2 coupler having a 50—50 splitting ratio and introducing a 0° and a 90° phase shift; and a phase delay of π radians in the first branch arm.

6. The optical pulse generator of claim 5 wherein each coupler is a Multi-Mode Interference coupler.

7. The optical pulse generator of claim 1 wherein the feedback arm includes a splitter leading to a signal monitoring system.

8. The optical pulse generator of claim 2 wherein the feedback arm includes a splitter leading to a signal monitoring system.

9. The optical pulse generator of claim 3 wherein the feedback arm includes a splitter leading to a signal monitoring system.

10. The optical pulse generator of claim 5 wherein the feedback arm includes a splitter leading to a signal monitoring system.

11. An optical pulse generator for receiving a continuous wave optical signal and producing a series of pulses, the optical pulse generator comprising:

a Mach-Zehnder Modulator (MZM) having a first input arm for receiving the continuous wave optical signal, a second input arm, a first output arm for producing the series of pulses, and a second output arm, and configured to operate such that substantially none of a continuous wave optical signal enters the second output arm when the MZM is not being driven by a variable voltage; and a feedback arm coupling the second output arm to the second input arm, and having a length such that a signal travelling in a loop around the MZM and the feedback arm has a propagation time given by $$\tau = (2n+1)\frac{T}{2}$$

where n is a non-negative integer and T is a pulse period of the pulses, and such that there is substantially no phase difference between a feedback signal propagating along the feedback arm and the continuous wave optical signal upon entering the MZM.

12. The optical pulse generator of claim 11 wherein the MZM comprises:

a first phase modulation section in a first branch arm, driven by a sinusoidal voltage at a driving frequency equal to half a pulse frequency of the series of pulses; and a second phase modulation section in a second branch arm, driven by a sinusoidal voltage at the driving frequency and 180° out of phase with the sinusoidal voltage driving the first phase modulation section.

13. The optical pulse generator of claim 11 wherein the MZM comprises:

a first 2×2 coupler having a 50—50 splitting ratio and introducing a 0° and a 90° phase shift;

a second 2×2 coupler having a 50—50 splitting ratio and introducing a 0° and a 90 phase shift; and a phase delay of $\pi$ radians in the first branch arm.

14. The optical pulse generator of claim 13 wherein each coupler is a Multi-Mode Interference coupler.

15. The optical pulse generator of claim 12 wherein the MZM comprises:

a first 2×2 coupler having a 50—50 splitting ratio and introducing a 0° and a 90° phase shift;

a second 2×2 coupler having a 50—50 splitting ratio and introducing a 0° and a 90° phase shift; and a phase delay of $\pi$ radians in the first branch arm.

16. The optical pulse generator of claim 15 wherein each coupler is a Multi-Mode Interference coupler.

17. The optical pulse generator of claim 11 wherein the feedback arm includes a splitter leading to a signal monitoring system.

18. The optical pulse generator of claim 12 wherein the feedback arm includes a splitter leading to a signal monitoring system.

19. The optical pulse generator of claim 13 wherein the feedback arm includes a splitter leading to a signal monitoring system.

20. The optical pulse generator of claim 15 wherein the feedback arm includes a splitter leading to a signal monitoring system.

* * * * *